(12) United States Patent
Knauf

(10) Patent No.: US 6,656,401 B1
(45) Date of Patent: Dec. 2, 2003

(54) METHOD FOR EXTRUSION COATING MULTIPLE WEBS

(75) Inventor: Gary H. Knauf, Bear Creek, WI (US)

(73) Assignee: International Paper Company, Purchase, NY (US)

( * ) Notice: Subject to any disclaimer, the term of this patent is extended or adjusted under 35 U.S.C. 154(b) by 0 days.

(21) Appl. No.: 09/978,392

(22) Filed: Oct. 16, 2001

(51) Int. Cl.⁷ .................................................. B29C 47/00
(52) U.S. Cl. .................. 264/146; 264/160; 264/171.13; 264/173.12
(58) Field of Search .................. 264/146, 160, 264/171.13, 171.23, 173.12, 173.14, 211.23; 156/243, 244.11

(56) References Cited

U.S. PATENT DOCUMENTS

| | | | |
|---|---|---|---|
| 2,686,335 A | 8/1954 | Gros | |
| 2,690,633 A | 10/1954 | Denton | |
| 2,836,851 A | 6/1958 | Holt | |
| 3,385,026 A | 5/1968 | Schmermund | |
| 3,505,143 A | * 4/1970 | Haas et al. | 156/243 |
| 3,632,256 A | 1/1972 | Kasting et al. | |
| 3,650,880 A | * 3/1972 | Tieniber | 442/76 |
| 3,996,728 A | 12/1976 | Gentili | |
| 4,207,129 A | * 6/1980 | Tadewald | 156/242 |
| 4,233,358 A | 11/1980 | Jones et al. | |
| 4,302,269 A | * 11/1981 | Steinberg et al. | 156/243 |
| 4,362,585 A | 12/1982 | de Antonis et al. | |
| 4,554,777 A | 11/1985 | Denk et al. | |
| 4,592,938 A | 6/1986 | Benoit | |
| 4,675,016 A | 6/1987 | Meuli et al. | |
| 4,759,816 A | 7/1988 | Kasper et al. | |
| 4,837,088 A | * 6/1989 | Freedman | 156/243 |
| 5,005,734 A | 4/1991 | Van Gordon | |
| 5,056,294 A | 10/1991 | Focke | |
| 5,175,978 A | 1/1993 | Knauf | |
| 5,250,348 A | 10/1993 | Knauf | |
| 5,360,629 A | 11/1994 | Milbourn et al. | |
| 5,415,910 A | 5/1995 | Knauf | |
| 5,535,573 A | 7/1996 | Focke et al. | |
| 5,691,022 A | 11/1997 | Knauf | |
| 5,700,586 A | 12/1997 | Laiho et al. | |
| 6,080,252 A | 6/2000 | Plourde | |
| 6,150,005 A | 11/2000 | Knauf | |
| 6,153,306 A | 11/2000 | Selin et al. | |
| 6,210,767 B1 | 4/2001 | Knauf | |

* cited by examiner

Primary Examiner—Mark Eashoo
(74) Attorney, Agent, or Firm—Luedeka, Neely & Graham, P.C.

(57) ABSTRACT

The specification discloses a method for extrusion coating multiple substrate webs on a dual or tandem extruder system having multiple extruder stations. The method includes as an initial step providing a first substrate web and a second substrate web wherein each of the first and second substrate webs has a coating side and an underside. The webs are temporarily joined to form a composite web wherein the respective coating sides face outward and the respective undersides face one another. A first polymer coating is extruded on the coating side of the first web at a first extrusion station. Subsequently, a second polymer coating is extruded on the coating side of the second web at a second extrusion station. The extrusion coated first and second webs are then separated. The invention enables more efficient and economical use of dual or tandem extruder systems.

43 Claims, 5 Drawing Sheets

METHOD FOR EXTRUSION COATING MULTIPLE WEBS

FIELD OF THE INVENTION

The invention relates to a method for making webs and, in particular, to a new method for extrusion coating multiple webs simultaneously on a dual or tandem extruder system having multiple extruder stations.

BACKGROUND OF THE INVENTION

Webs such as paper and paperboard, polymer films, and metal foils which have been extrusion coated with a layer of polymer film are used in a myriad of applications such as packaging materials and so forth. In some instances, it is desireable to apply two extrusion coatings to a substrate web so that both sides of the substrate are coated with an extruded polymer film. For these cases, so called "tandem" or dual extruders have been developed with multiple extrusion stations.

However, cases requiring a coating on both sides of a web by means of a dual extruder may not be plentiful enough to maintain a tandem extruder at full capacity. In these instances, it has been common practice to simply shut down one of the extruder stations and operate the dual extruder in the same manner as a single station extruder. While this prevents the extruder from remaining completely idle, it still represents a significant waste of capital resources.

It is therefore an object of the invention to provide a method for achieving more efficient and economical utilization of a dual or multiple station extruder.

Another object of the invention is to provide a method for producing extrusion-coated substrates at a higher production rate.

SUMMARY OF THE INVENTION

With regard to the foregoing and other objects and advantages, the present invention provides a method for extrusion coating multiple webs in an extruder system containing multiple extrusion stations. In one embodiment, the method includes feeding a first web and a second web into a first extrusion station in the extruder system, where each web has a coating side and an underside. The webs are arranged one with respect to the other to form a temporary composite wherein respective undersides of the webs face each other and their respective coating sides face outwardly, away from each other. A first polymer coating is extruded on the coating side of the first web at the first extrusion station. The composite is fed to a second extrusion station following extrusion of the first polymer coating thereon. At the second extrusion station, a second polymer coating is extruded on the coating side of the second web of the composite. The extrusion coated first and second webs are then separated.

According to another aspect of the invention, a method is provided for extrusion coating multiple webs in an extruder system containing multiple extrusion stations which includes feeding a first web and a second web into the extruder system, each web having a coating side, conveying the first web to a first extrusion station in the extruder system and extruding a first polymer coating on the coating side of the first web at the first extrusion station and conveying the second web to a second extrusion station in the extruder system and extruding a second polymer coating on the coating side of the second web at the second extrusion station.

It is also preferred in certain embodiments that the first and second webs comprise the same or similar materials. However, in other embodiments it is preferred that the first and second webs comprise substantially different materials. Preferred materials for the first and second webs include paper webs, polymer films, nonwoven fabrics, metal foils, and two or more thereof as a multi-ply web. The first and second webs preferably each have a basis weight of from about 7 lbs/3000 ft$^2$ to about 125 lbs/3000 ft$^2$ and a caliper of from about 0.5 mils to about 10 mils.

Likewise, in certain embodiments it may be preferred that the first and second webs be extrusion coated with the same type of polymer. However in certain other embodiments, it may be preferred that the first and second webs are extrusion coated with different types of polymers. Preferably the first and second polymer coatings comprise a polymer selected from the group consisting of low density polyethylene (LDPE), polyolefin plastomers (POP), polyolefin elastomers (POE), linear low density polyethylene (LLDPE), high density polyethylene (HDPE), polypropylene (PP), ethylene methyl acrylate copolymer (EMA), ethylene butyl acrylate copolymer (EnBA), ethylene vinyl acetate copolymer (EVA), ethylene acrylic acid copolymer (EAA), ethylene methyl acrylic acid copolymer (EMAA), ionomoers such as SURLYN, ethylene vinyl alcohol (EVOH), polyesters such as polyethylene terephthalate (PET), and polyamides (PA) such as nylon-6 and nylon-6,6, and mixtures of two or more thereof.

The invention therefore enables use of a dual station extruder to provide webs which are extrusion coated only on one side. In comparison to prior art, methods, the method of the invention essentially increases the production rate for such single-side coated webs by a factor of two or more.

BRIEF DESCRIPTION OF THE DRAWINGS

The above and other aspects and advantages of the invention will now be further described in conjunction with the accompanying drawings in which.

DETAILED DESCRIPTION OF THE INVENTION

The invention involves a method for extrusion coating multiple webs on dual tandem extruder systems having multiple extrusion stations. According to one embodiment, the method includes as an initial step providing a first web and a second web wherein each of the first and second webs have a coating side and an underside. The webs are superposed one with respect to the other to form a temporary composite wherein the respective coating sides face outward and the respective undersides face one another. A first polymer coating is extruded on the coating side of the first web at a first extrusion station. A second polymer coating is extruded on the coating side of the second web at a second extrusion station. The extrusion coated first and second webs are then separated.

In the practice of the invention using, for example, a dual extruder two extrusion stations are typically arranged in series along the direction of travel of a substrate to be coated. Each extrusion station includes a hopper into which solid pellets of the polymeric coating material are fed, a heating zone wherein the polymer is melted prior to extrusion, and a slot or die through which the molten extrudate is feed and applied to the awaiting substrate web. One such dual extruder is available from Egan-Davis Standard of Somerville, N.J.

Figure 1:
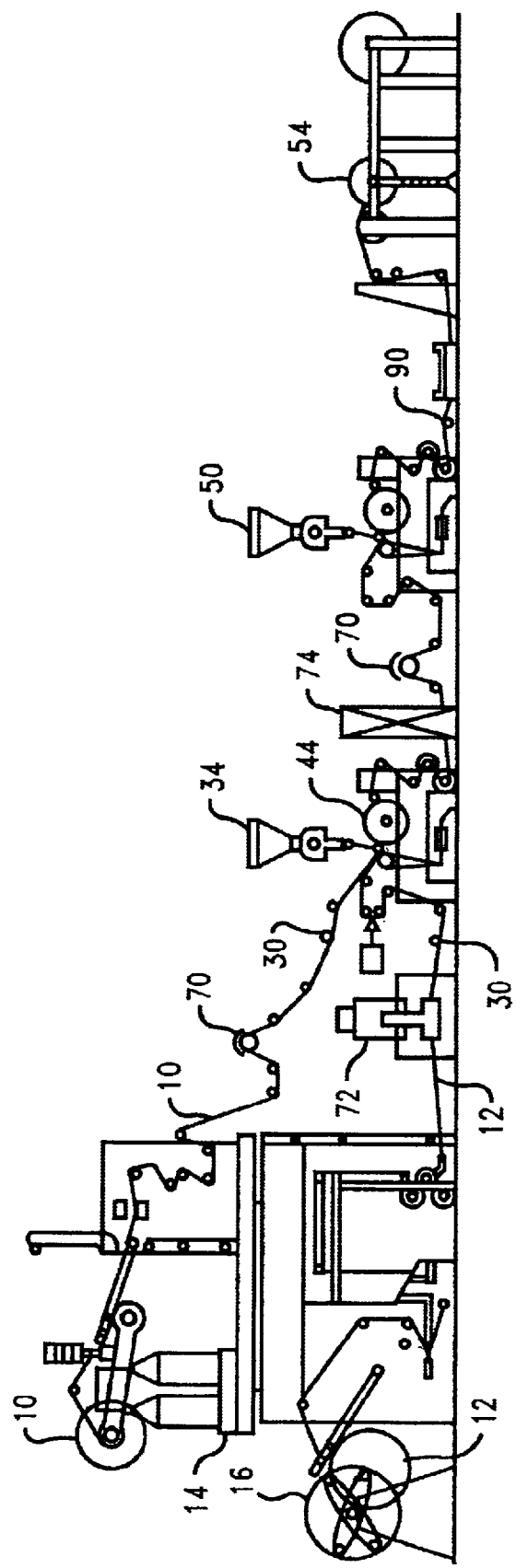
FIG. 1 is an elevational view of a dual extruder system for use in practicing one embodiment of the present invention.

Referring now to the drawings, various aspects of one embodiment a method according to the invention will now be described with reference to FIG. 1 wherein a first web 10 and a second web 12 are supplied to a dual extruder, preferably from separate unwind stands 14, 16.

As used herein, the term "first web" merely refers to the web which is coated with the first coating at the first extrusion station. Likewise, the term "second web" refers to the web which is coated with the second coating at the second extrusion station. The terms "first substrate or web" and "second substrate or web" are sometimes used in the extrusion coating art to designate the web from the unwind stand nearest the ground (the first web) and the web from the unwind stand located above the first web (the second web). The nomenclature used herein may not necessarily correspond to this convention sometimes used in the art.

It is also to be noted that both unwind stands 14, 16 may be considered "primary" unwind stands as opposed to "secondary" unwind stands. Conventionally, when two webs are laminated together, a heavier, so-called "substrate" web is ordinarily referred to as the "primary" web taken from the primary unwind, and a lighter web is ordinarily called the "secondary" web taken from a secondary unwind stand, at least in conjunction with operation of the dual or multiple station extruder system. However, the first and second webs are preferably not ultimately laminated together according to the invention, at least in conjunction with operation of the dual or multiple station extruder system. Thus each web is, in essence, a primary web (according to trade nomenclature) and is taken from a primary unwind stand.

The first web 10 is provided as a substantially continuous web having two elongate, substantially parallel surfaces 20, 22 and a thickness therebetween which is small in comparison to the length and width of the surfaces. One of the surfaces serves as a coating side 20 and the second as an underside 22. Typically, such webs 10 have a basis weight of from about 7 lbs/3000 ft$^2$ to about 125 lbs/3000 ft$^2$ and a thickness or caliper of from about 0.5 mil to about 10 mils. More preferably the basis weight is from about 15 lbs/3000 ft$^2$ to about 90 lbs/3000 ft$^2$ and the thickness ranges from about 1.0 mils to about 8.0 mils. Among preferred materials for the first web 10 are paper webs (including paperboard webs), polymer films (including oriented polymer films), metal foils, nonwoven fabrics, and two or more thereof supplied as a multi-ply web.

Like the first web 10, the second web 12 is provided as a substantially continuous web having two elongate, substantially parallel surfaces 24, 26 and a thickness therebetween which is small in comparison to the length and width of the surfaces, one of which serves as a coating side 24 and the second as an underside 26. Typically such webs have a basis weight of from about 7 lbs/3000 ft$^2$ to about 125 lbs/3000 ft$^2$ and a thickness or caliper of from about 0.5 mil to about 10 mils. More preferably the basis weight is from about 15 lbs/3000 ft$^2$ to about 90 lbs/3000 ft$^2$ and the thickness ranges from about 1.0 mil to about 8.0 mils. Preferred materials for the first substrate web 12 are paper webs (including paperboard webs), polymer films (including oriented polymer films), metal foils, nonwoven fabrics, and two or more thereof supplied as a multi-ply web.

The first and second webs 10, 12 may, if desired, be substantially identical, being formed from the same materials at substantially the same thicknesses and basis weights. However, the invention is not so limited and in certain preferred embodiments of the invention, the first and second substrates 10, 12 may differ substantially in material, weight, width, and/or thickness.

The locations of the unwind stands 14, 16 relative to the extrusion stations may vary in the practice of the invention.

Figure 2:
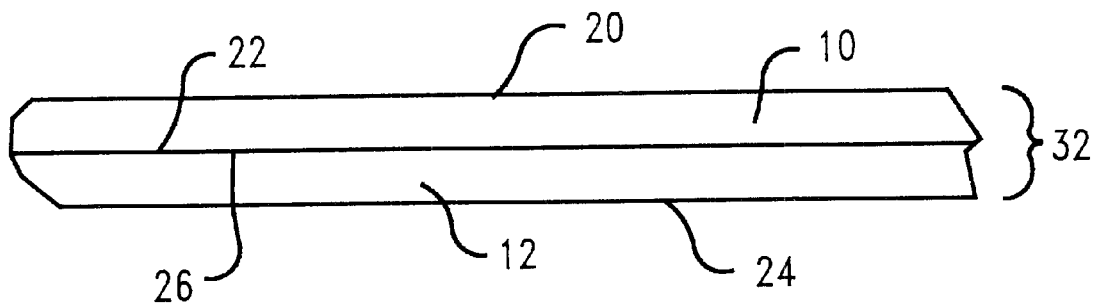
FIG. 2 is an enlarged elevational view of two webs aligned on top of one another for processing in a dual extruder system according to one embodiment of the invention.

In one preferred embodiment, the unwind stands 14, 16 are both situated adjacent the front of the extruder line and, as the first and second webs 10, 12 are unwound from their respective unwind stands 14, 16, the two webs are temporarily joined to one another along at least a portion of the length of the webs. This joining together is not permanent, however, in that the first web 10 is merely temporarily disposed on the second web 12 with the respective undersides 22, 26 of the webs contacting one another as seen in FIG. 2.

Generally, the interfacial friction against any lateral sliding of the webs with respect to one another will be sufficient to keep them aligned. However, they may be temporarily adhered to one another by any of several methods. For instance, one or more edges of the two webs 10, 12 may be crimped together to hold the two webs 10, 12 together. The crimping may be accomplished at any point along the web path of wherein the webs 10, 12 are in contact with one another and prior to collection of the webs on a wind up stand using an edge crimping device 90.

Alternatively, an adhesive may be applied to one or both of the web undersides 22, 26. The adhesive may be applied by a sprayer or other coating device 72. Advantageously the coating or spray need only be applied just prior to making roll change on the windup stand.

The webs 10, 12 may also be joined by applying a static charge to one or both of the webs by a static charge device 30 prior to their contacting with each other. The static charges imparted to the webs 10, 12 may then be used to temporarily join the first web to the second web. The static charge may preferably be applied across the entire width of the web or webs.

In another preferred embodiment, the extrusion coating itself may be used to temporarily join the webs 10, 12 along one or more edges. In this embodiment, either the widths of the two webs 10, 12 differ or the webs are offset from one another somewhat so that the respective edges of the webs 10, 12 are not aligned as the webs 10, 12 pass through the extrusion stations. The extrudate then tacks down the webs 10, 12 along the unaligned edge or edges.

Any one or a combination of the above methods may be used to join the webs 10, 12 depending on the types of substrates employed.

For convenience, the temporarily joined webs are referred to collectively as the "composite web" 32.

In certain other embodiments of the invention, it may be preferred that the first web 10 be coated in the first extrusion station as a single web. Thereafter the second web 12 may be laid on to the first web 10 prior to entering the second extrusion station. In this manner, the second web 12 as well as the first web 10 may be unwound coating side up, thereby eliminating the need to invert the webs after the first extrusion station.

In another preferred embodiment, the first and second webs 10, 12 may be extrusion coated separately and then joined prior to being wound up together. Alternatively, the webs may be wound up separately without ever being joined together using dual windup stands at the end of the multi-station extruder.

It is especially preferred, however, that the first and second webs 10, 12 be temporarily joined as shown in FIG. 2 because this facilities collecting both finished webs on a single windup stand for later separation using a rewinder. The temporary joining also allows automatic roll changes to be made at the windup stand at or near full line speed. For this purpose, the webs 10, 12 need only be joined along a portion of the webs 10, 12.

At least one layer of polymeric coating is disposed on the respective coating sides of the first and second webs 20, 24. Preferably the extruded coatings on the first and second webs 10, 12 comprise a polymer selected from the group consisting of low density polyethylene (LDPE), polyolefin plastomers (POP), polyolefin elastomers (POE), linear low density polyethylene (LLDPE), high density polyethylene (HDPE), polypropylene (PP), ethylene methyl acrylate copolymer (EMA), ethylene butyl acrylate copolymer (EnBA), ethylene vinyl acetate copolymer (EVA), ethylene acrylic acid copolymer (EAA), ethylene methyl acrylic acid copolymer (EMAA), ionomoers such as SURLYN (which is understood to be a salt of poly (ethylene-co-methacrylic acid) available from Dupont), ethylene vinyl alcohol (EVOH), polyesters such as polyethylene terephthalate (PET), polyamides such as nylon-6 and nylon-6,6, and mixtures of two or more thereof. If desired, multiple layers of the aforementioned polymers may be coextruded as well. The extruded polymer coating may contain conventional additives such as fillers, binders, extenders, and the like.

Of the aforementioned polymers for the extrusion coating, particularly preferred are low density polyethylene (LDPE), polyolefin plastomers (POP), polyolefin elastomers (POE), linear low density polyethylene (LLDPE), high density polyethylene (HDPE), and mixtures thereof.

The thickness and coating weight of the polymer layer may also vary somewhat based on the particular application. However, the polymer coatings typically have a thickness of from about 0.21 mils to about 2.0 mils and a weight of from about 3 lb/3000 ft$^2$ to about 29 lb/3000ft$^2$.

Figure 3:
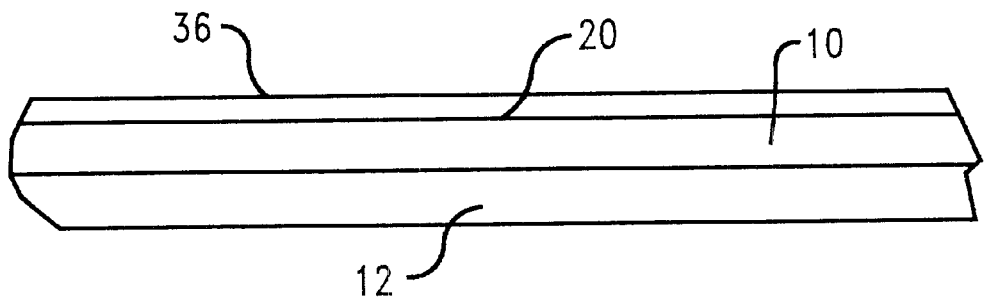
FIGS. 3 and 4 are elevational views of the webs of FIG. 2 illustrating the application of extrusion coatings to the webs according to the invention.
Figure 6:
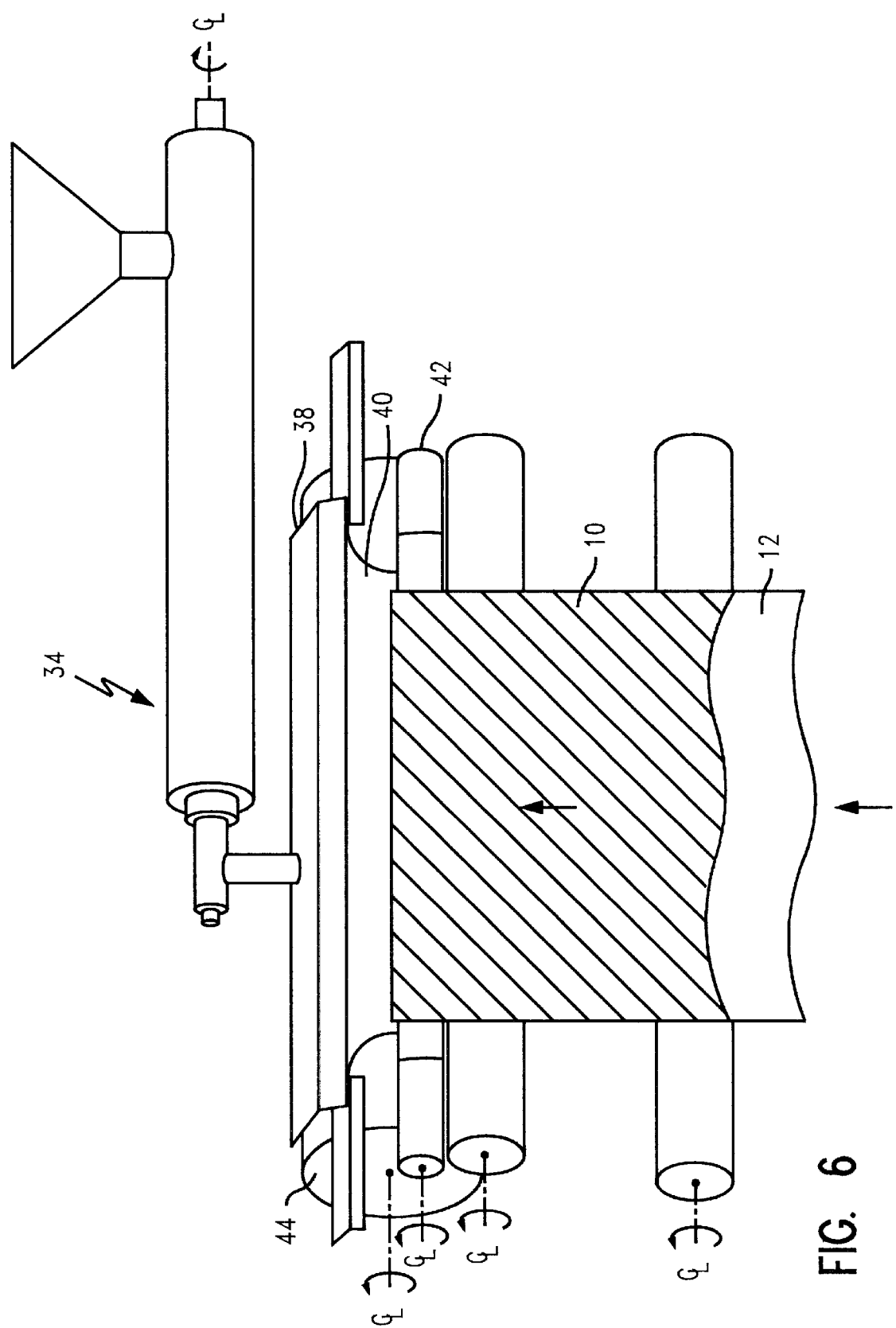
FIG. 6 is an elevational view illustrating in greater detail a portion of an extruder system suitable for use in practicing one embodiment of the invention.

Prior to the extrusion coating, either the first web 10 and/or the second web 12 may be surface treated, such as with a flame treatment or in an electrical corona discharge device 70, in order to oxidize the surface of the web and provide improved adhesion of the polymer coating to the web. The two webs 10, 12 are then conveyed to a first extrusion station 34 where the first polymer coating 36 is applied to the coating side of the first web 20 to provide a coated composite as illustrated in FIG. 3. Preferably, polymer is supplied in the form of pellets of the polymer which are fed into a hopper and melted and mixed with any additives to provide a fluid, relatively uniform melt-extrudible mass. The molten material is then fed through an extrusion die 38 (seen in FIG. 6), and a resulting curtain of the extruded polymeric material 40 is extruded onto the composite web 32 as it passes through a nip in the extruder formed by a backup roll 42 and chill roll 44. Contacting with the chill roll 44 cools and solidifies the extrudate on the first coating side 20.

Typically the polymer melt is extruded at a feed rate of about 500 lb/hr to about 1000 lb/hr while the composite web is conveyed at a speed of about 750 ft/min to about 1500 feet/min. This results in a polymeric coating 36 having a thickness of about 0.5 mils. However, it will be appreciated that polymer feed rate, web width, and the web travel rate may be varied so as to provide thicker or thinner polymer coatings.

A suitable extrusion coating method, and materials for use therein, is described in commonly assigned application Ser. No. 09/978,524 entitled "Method for Extrusion Coating a Lightweight Web" having the same inventor as the present application and being filed on even date herewith, the disclosure of which is hereby incorporated by reference.

After the molten extrudate cools on the first web 10 to form a first coating 36 thereon, the composite web 32 is conveyed onward to a second extrusion station 50. During this movement, the first and second webs 10, 12 of the composite web 32 may be inverted or otherwise reoriented so that the second web 12 is properly aligned for coating at the second extrusion station 50. This may be accomplished using a set of turning bars 74.

Figure 4:
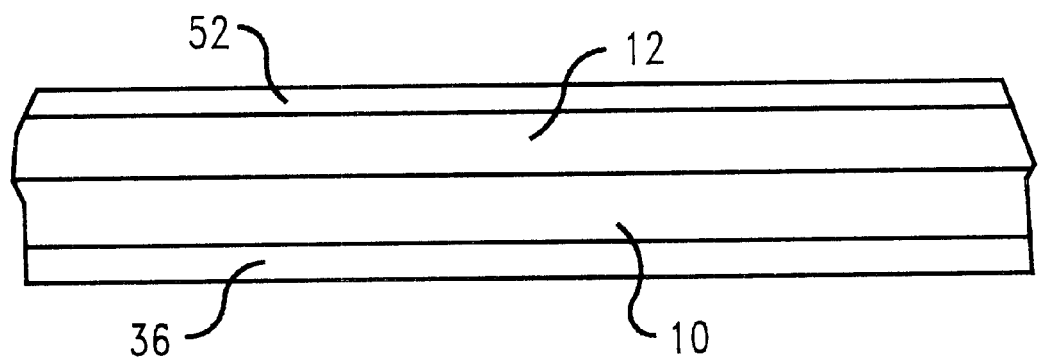

At the second extrusion station 50, the second web coating side 24 is extrusion coated with a second polymer coating 52 as shown in FIG. 4. As with the first extrusion station, the molten polymer (along with any desired additives) is then fed through a second extrusion die and a curtain of the polymer is extruded onto the composite web as it passes through a nip in the extruder formed by a backup roll and a chill roll. Contact with the chill roll cools and solidifies the second polymer coating extrudate 52 forming a layer of polymeric coating on the composite web 32.

Typically, the second polymer melt is also extruded at a feed rate of about 500 lb/hr to about 1000 lb/hr while the web is conveyed at a speed of about 750 ft/min to about 1500 feet/min to provide a polymer coating 52 having a thickness of about 0.5 mils.

Figure 5:
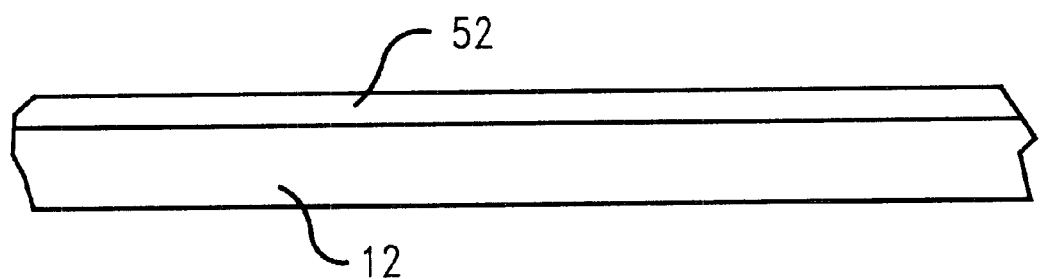
FIG. 5 is an elevational view of the finished and separated webs according to one embodiment of the invention.
Figure 5:
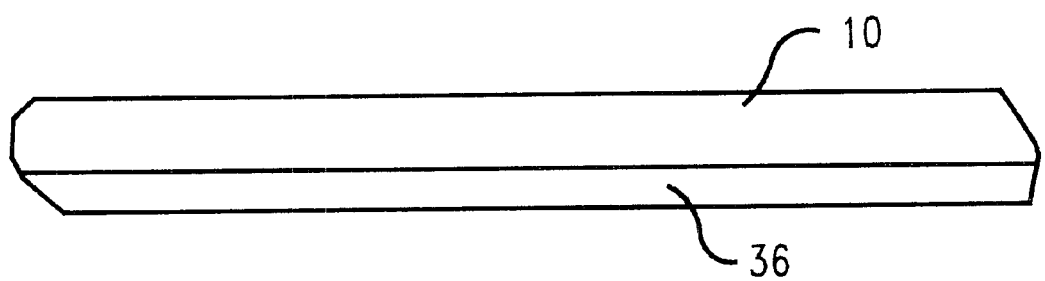

Finally, the two webs 10, 12, now each extrusion coated with a polymeric film, may be collected. The webs 10, 12 may be separated from one another on-line as seen in FIG. 5 and collected on separate wind up rolls directly after the second extrusion coating.

Figure 7:
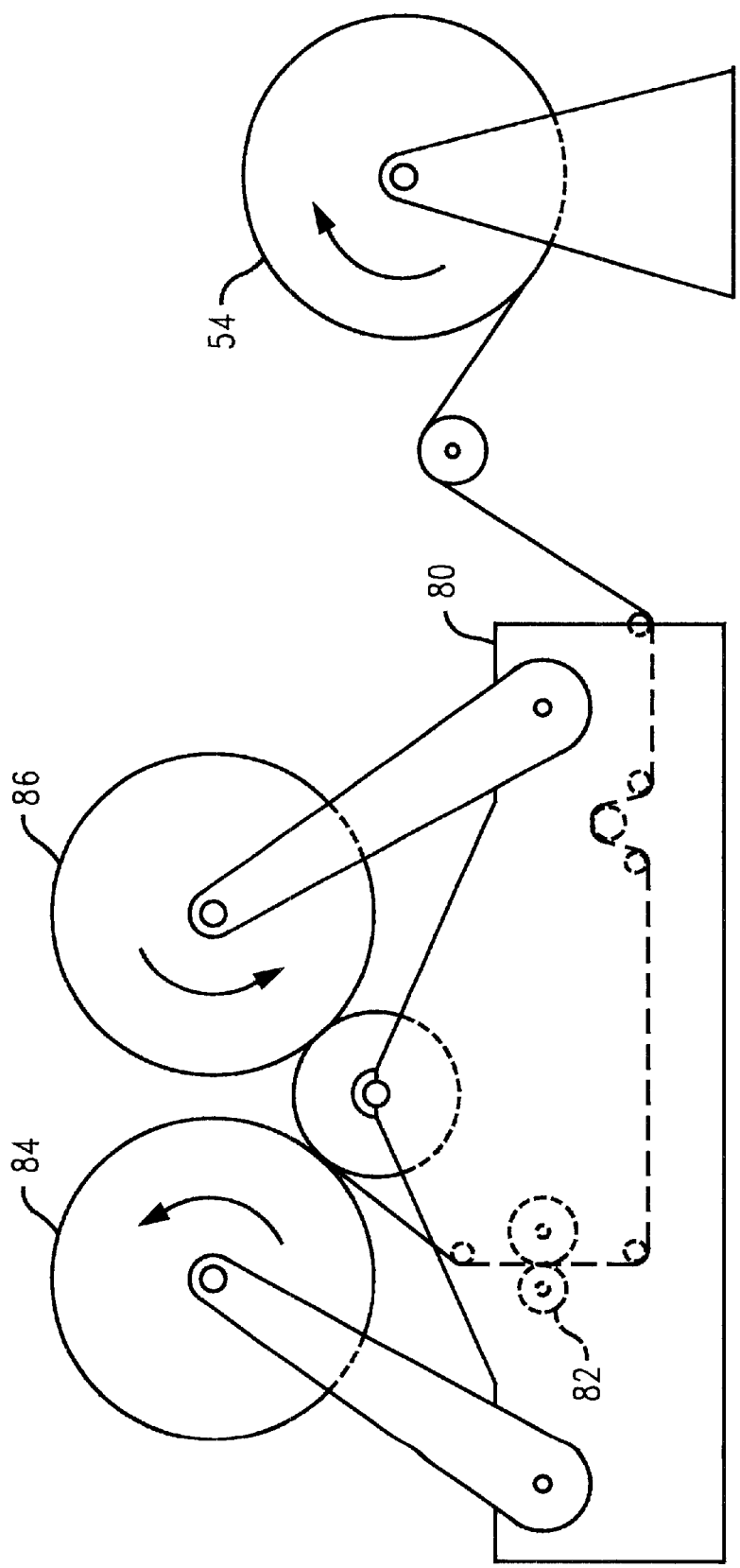
FIG. 7 is an elevational view of a web rewinder for separating two coated webs according to a preferred embodiment of the invention.

However, most extrusion coating machines currently in operation only have one windup stand. Therefore, it is preferred that the first and second webs 10, 12 be initially wound up together as a composite roll 54. As noted above, when collected as a composite roll, the webs are preferably temporarily joined together, typically along the edges of the webs 10, 12. The composite roll 54 may then be processed on a rewinder apparatus 80, shown in FIG. 7, which includes a trimmer 82 which cuts away the joined edges thereby separating the finished webs and allowing the webs 10, 12 to be individually wound up on two separate windup rolls 84, 86.

By the use of the aforegoing method it will be appreciated that a dual or tandem station extruder may be used to approach or fulfill its rated capacity while applying one-side only coatings to substrate webs. Moreover, the method allows the production speed of a dual extruder to be effectively doubled when used for one-side only coatings since two such products may now be extrusion-coated at once.

As noted, the two substrates and their respective coatings may be the same. The invention may thus be used to dramatically increase the rate of production of a single type of extrusion coated substrate. However, the substrates and/or their polymer coating may also different. Thus, the invention provides a means to produce small batches of relatively low-volume coated substrate without halting production of much larger batches of a higher selling-volume product.

The following nonlimiting example illustrates various additional aspects of the invention.

EXAMPLE 1

Two webs of kraft paper, each having a basis weight of about 31.5 lbs/3000 ft$^2$ and a caliper of about 2.5 mils and having widths of about 31.75 inches (the first web) and 34 inches (the second web) respectively were unwound from separate rolls and conveyed to an extrusion coating system by a series of rollers and idlers. The two webs so combined were passed through a first extrusion station.

In the first extrusion, a supply of low density polyethylene, EASTACOAT 6838-850P available from Eastman Chemical Co. of Longview, Tex. was heated to a temperature of about 610° F. to provide a supply of molten extrudate. The molten extrudate was then feed through an extrusion die at a feed rate of about 250 lb/hr to coat the exposed side of the first paperweb as it moved through the extrusion station. The extrudate was cooled by contacting with a chill roll forming a polymer coating over the kraft paper of the first web. The polymer coating weight was about 8 lbs/ream.

Because of the slightly narrower width of the first web, the extrudate coating temporarily joined the two webs together.

A second extrusion coating was then applied to the second substrate web. A second supply of low density polyethylene was heated to a temperature of about 610° F. to provide a supply of molten extrudate. The molten extrudate was then fed through an extrusion die at a feed rate of about 250 lb/hr to coat the second paperweb as it moved through the second extrusion station. The extrudate was cooled by contacting with a chill roll to form a polymer coating over kraft paper of the first web. The polymer coating weight formed on the second web was also about 8 lbs/ream.

The embodiments described above are intended to be exemplary only. It will be appreciated by those of skill in the art that the invention may be practiced using a variety of extrusion station configurations wherein the number and location of the unwind and windup stations may be varied in relation to the extrusion coating stations, and that numerous other modifications, variations and substitutions may exist within the spirit and scope of the appended claims.

What is claimed is:

1. A method for extrusion coating multiple webs in an extruder system containing multiple extrusion stations comprising:

feeding a first web and a second web into a first extrusion station in the extruder system, each web having a coating side and an underside, the webs being arranged one with respect to each other to form a temporary composite wherein the respective undersides of the webs face each other and their respective coating sides face outwardly, away from each other;

extruding a first polymer coating on the coating side of the first web of the composite at the first extrusion station;

feeding the composite to a second extrusion station following extrusion of the first polymer coating thereon;

extruding a second polymer coating on the coating side of the second web of the composite at the second extrusion station; and separating the extrusion coated first and second webs of the composite.

2. The method of claim 1 wherein the first and second webs comprise the same web material.

3. The method of claim 1 wherein the first and second webs comprise different web materials.

4. The method of claim 1 wherein the first and second webs are extrusion coated with the same type of polymer.

5. The method of claim 1 wherein the first and second webs are extrusion coated with different types of polymers.

6. The method of claim 1 wherein the first polymer is selected from the group consisting of low density polyethylene (LDPE), polyolefin plastomer (POP), polyolefin elastomer (POE), linear low density polyethylene (LLDPE), high density polyethylene (HDPE), polypropylene (PP), ethylene methyl acrylate copolymer (EMA), ethylene butyl acrylate copolymer (EnBA), ethylene vinyl acetate copolymer (EVA), ethylene acrylic acid copolymer (EAA), ethylene methyl acrylic acid copolymer (EMAA), ionomoers, ethylene vinyl alcohol (EVOH), polyesters such as polyethylene terephthalate (PET), polyamides (PA), and mixtures of two or more thereof.

7. The method of claim 1 wherein the second polymer coating comprises a polymer selected from the group consisting of low density polyethylene (LDPE), polyolefin plastomer (POP), polyolefin elastomer (POE), linear low density polyethylene (LLDPE), high density polyethylene (HDPE), polypropylene (PP), ethylene methyl acrylate copolymer (EMA), ethylene butyl acrylate copolymer (EnBA), ethylene vinyl acetate copolymer (EVA), ethylene acrylic acid copolymer (EAA), ethylene methyl acrylic acid copolymer (EMAA), ionomoers, ethylene vinyl alcohol (EVOH), polyesters such as polyethylene terephthalate (PET), polyamides (PA), and mixtures of two or more thereof.

8. The method of claim 1 wherein the first web is selected from the group consisting of paperwebs, polymer films, nonwoven fabrics, metal foils, and multi-ply webs comprising two or more thereof.

9. The method of claim 1 wherein the second web is selected from the group consisting of paperwebs, polymer films, nonwoven fabrics, metal foils, and multi-ply webs comprising two or more thereof.

10. The method of claim 1 wherein the first web has a caliper of from about 0.5 mils to about 10 mils and a basis weight of from about 7 lbs/3,000 ft$^2$ to about 125 lbs/3,000 ft$^2$.

11. The method of claim 1 wherein the second web has a caliper of from about 0.5 mils to about 10 mils and a basis weight of from about 7 lbs/3,000 ft$^2$ to about 125 lbs/3,000 ft$^2$.

12. The method of claim 1 further comprising the step of inverting the composite web prior to extruding the second polymer coating on the coating side of the second web of the composite.

13. The method of claim 1 wherein the coated first and second webs are wound up together on a single windup stand prior to being separated.

14. The method of claim 1 wherein the coated first and second webs are temporarily joined together along at least one edge and are separated by trimming off the joined edge and winding the first and second webs onto separate windup rolls.

15. The method of claim 1 wherein the coated first and second webs are separated and collected on separate wind up rolls after the second polymer coating is extruded.

16. The method of claim 1 wherein the first polymer coating comprises a coextrusion of a plurality of polymer coatings.

17. The method of claim 1 wherein the second polymer coating comprises a coextrusion of a plurality of polymer coatings.

18. A method for extrusion coating multiple webs in an extruder system containing multiple extrusion stations comprising:
feeding a first web and a second web into the extruder system, each web having a coating side, the webs being arranged adjacent each other to form a separable temporary composite;
conveying the first web to a first extrusion station in the extruder system and extruding a first polymer coating on the coating side of the first web at the first extrusion station;
conveying the second web to a second extrusion station in the extruder system and extruding a second polymer coating on the coating side of the second web at the second extrusion station; and
thereafter separating the coated first and second webs of the temporary composite.

19. The method of claim 18 wherein the first and second web substrates comprise the same substrate material.

20. The method of claim 18 wherein the first and second web substrates comprise different substrate materials.

21. The method of claim 18 wherein the first and second webs are extrusion coated with the same type of polymer.

22. The method of claim 18 wherein the first and second webs are extrusion coated with different types of polymers.

23. The method of claim 18 wherein the first polymer coating comprises a polymer selected from the group consisting of low density polyethylene (LDPE), polyolefin plastomer (POP), polyolefin elastomer (POE), linear low density polyethylene (LLDPE), high density polyethylene (HDPE), polypropylene (PP), ethylene methyl acrylate copolymer (EMA), ethylene butyl acrylate copolymer (EnBA), ethylene vinyl acetate copolymer (EVA), ethylene acrylic acid copolymer (EAA), ethylene methyl acrylic acid copolymer (EMAA), ionomoers, ethylene vinyl alcohol (EVOH), polyesters such as polyethylene terephthalate (PET), polyamides (PA), and mixtures of two or more thereof.

24. The method of claim 18 wherein the second polymer coating comprises a polymer selected from the group consisting of low density polyethylene (LDPE), polyolefin plastomer (POP), polyolefin elastomer (POE), linear low density polyethylene (LLDPE), high density polyethylene (HDPE), polypropylene (PP), ethylene methyl acrylate copolymer (EMA), ethylene butyl acrylate copolymer (EnBA), ethylene vinyl acetate copolymer (EVA), ethylene acrylic acid copolymer (EAA), ethylene methyl acrylic acid copolymer (EMAA), ionomoers, ethylene vinyl alcohol (EVOH), polyesters such as polyethylene terephthalate (PET), polyamides (PA), and mixtures of two or more thereof.

25. The method of claim 18 wherein the first web is selected from the group consisting of paperwebs, polymer films, nonwoven fabrics, metal foils, and multi-ply webs comprising two or more thereof.

26. The method of claim 18 wherein the second web is selected from the group consisting of paperwebs, polymer films, nonwoven fabrics, metal foils and multiply webs comprising two or more thereof.

27. The method of claim 18 wherein the first web has a caliper of from about 0.5 mils to about 10 mils and a basis weight of from about 7 lbs/3,000 ft$^2$ to about 125 lbs/3,000 ft$^2$.

28. The method of claim 18 wherein the second web has a caliper of from about 0.5 mils to about 10 mils and a basis weight of from about 7 lbs/3,000 ft$^2$ to about 125 lbs/3,000 ft$^2$.

29. The method of claim 18 further comprising the step of inverting the composite web prior to extruding the second polymer coating.

30. The method of claim 18 wherein the first and second webs are wound up together on a single roll and are fed into the extruder system from the single roll.

31. The method of claim 30 wherein the coated first and second webs are temporarily joined together along at least one edge and are separated by trimming off the joined edge and winding the first and second webs onto separate windup rolls.

32. The method of claim 18 wherein the coated first and second webs are separated and collected on separate wind up rolls directly after the second polymer coating is extruded.

33. The method of claim 18 wherein the first polymer coating comprises a coextrusion of a plurality of polymer coatings.

34. The method of claim 18 wherein the second polymer coating comprises a coextrusion of a plurality of polymer coatings.

35. The method of claim 18 wherein the first and second webs are coated on their respective coating sides before they are separated.

36. The method of claim 18 wherein the first and second webs of the temporary composite are coated on their respective coating sides sequentially in the first and second coating stations.

37. The method of claim 18 wherein the first and second extruder stations comprise part of the same extruder and the respective coating sides of the first and second webs are coated substantially simultaneously in the same extruder.

38. The method of claim 18 wherein the first and second extruder stations comprise part of the same extruder and the respective coating sides of the first and second webs are coated in sequence in the same extruder.

39. The method of claim 18 wherein the first and second webs are in contact with each other in the temporary composite.

40. The method of claim 18 wherein one or both of the first and second webs is substantially uncoated on its coating side prior to having a polymer coating extruded thereon.

41. The method of claim 18 wherein one or both of the first and second webs contains on its coating side one or more layers of one or more materials coated thereon prior to having a polymer coating extruded thereon.

42. The method of claim 18 wherein the webs are separated off-line in an operation separate from the extruder system.

43. The method of claim 18 wherein the first and second webs are wound up on separate rolls and are fed into the extruder system from the separate rolls.

* * * * *